United States Patent
Sheriff et al.

(10) Patent No.: US 6,854,122 B1
(45) Date of Patent: Feb. 8, 2005

(54) JAVA COMMON INFORMATION MODEL INTERFACE FOR WINDOWS MANAGEMENT INSTRUMENTATION VIA COM/DCOM

(75) Inventors: Mohamed S. Sheriff, Portland, OR (US); Arvind Kumar, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 761 days.

(21) Appl. No.: 09/749,271

(22) Filed: Dec. 27, 2000

(51) Int. Cl.[7] .............................................. G06F 13/00
(52) U.S. Cl. ...................... 719/316; 719/328; 709/223
(58) Field of Search ................................ 719/316, 328, 719/315, 330, 320; 709/223

(56) References Cited

U.S. PATENT DOCUMENTS 6,317,748 B1 * 11/2001 Menzies et al. ......... 707/103 X
6,654,759 B1 * 11/2003 Brunet et al. ............... 707/101

OTHER PUBLICATIONS

Sun Microsystems. "Java Management Extensions White Paper." Jun. 1, 1999.*
Sun Microsystems. "Java Management Extensions Instrumentation and Agent Specification v 1.0." Jul. 2000.*
Sun Microsystems. "Java Dynamic Management Kit White Paper." Apr. 2000.*
Bellavista, Paolo et al. "An Integrated Resource Management Architecture for Wireless Smart Environments." Sep. 11, 2003.*

* cited by examiner

*Primary Examiner*—Lewis A. Bullock, Jr.
(74) *Attorney, Agent, or Firm*—Sharmini N. Green

(57) ABSTRACT

A system and method are disclosed for utilizing a computer with a first operating system to access and perform operations on a second computer having a different operating system, using a web-based adapter routine. A Java console accesses a web based adapter routine to implement a set of Java based APIs to perform CIM operations. The adapter routine, in conjunction with a Java Native Interface and a CIM to WMI mapper enables CIM operations to be performed on a managed server having for example, a Microsoft Operating System or XML based communications.

20 Claims, 3 Drawing Sheets

JAVA COMMON INFORMATION MODEL INTERFACE FOR WINDOWS MANAGEMENT INSTRUMENTATION VIA COM/DCOM

FIELD OF THE INVENTION

The invention described herein relates generally to methods for accessing hardware and software component information. Specifically, the invention relates to methods and apparatuses for accessing hardware and software component information remotely via a large, distributed public computer network, such as the Internet.

BACKGROUND OF THE INVENTION

Efforts exist in the computer server industry to develop standards for accessing components in a computer system, such as peripherals or boards in a computer. The focus of these efforts is to create manageable hardware building blocks that share data through a standard interface. One goal of developing such standards is to enable plug-and-play type architecture for hardware similar to that which is available for software.

Several standards like the Desktop Management Interface (DMI), Common Information Model (CIM) and Windows Management Instrumentation (WMI) define standard frameworks by which management data is accessed through operating system-based services.

One methodology for managing systems and networks has emerged, which methodology is termed Web based Enterprise Management (WBEM). With WBEM, both browsers and applications can be used to access information that is made available in network standard formats, such as HTML and XML. Built into Windows 98 and 2000, WBEM uses CIM as the database for information about computer systems and network devices.

Notwithstanding the significant strides that have been made with regard to technologies for system and network management, however, compatibility between the various system technologies and operating systems is lacking. For example, in the current server management technology environment, servers operating with Microsoft system management infrastructure are compatible with Distributed Component Object Model (DCOM) based access to the servers. In order to access these servers, an interface accessing the server must also run on the Microsoft Operating System (OS). Thus, for example, a user interface based on the Microsoft OS would be incompatible with non Microsoft OS based consoles, such as a Java based console.

This lack of compatibility is particularly disadvantageous in the WBEM context where, for example, a user desires to manage data in both a Java-based WBEM and Microsoft WMI environment using a single Java-based console.

The present invention is therefore directed to the problem of developing a method and apparatus for accessing hardware component information using a Java console.

DETAILED DESCRIPTION

Figure 1:
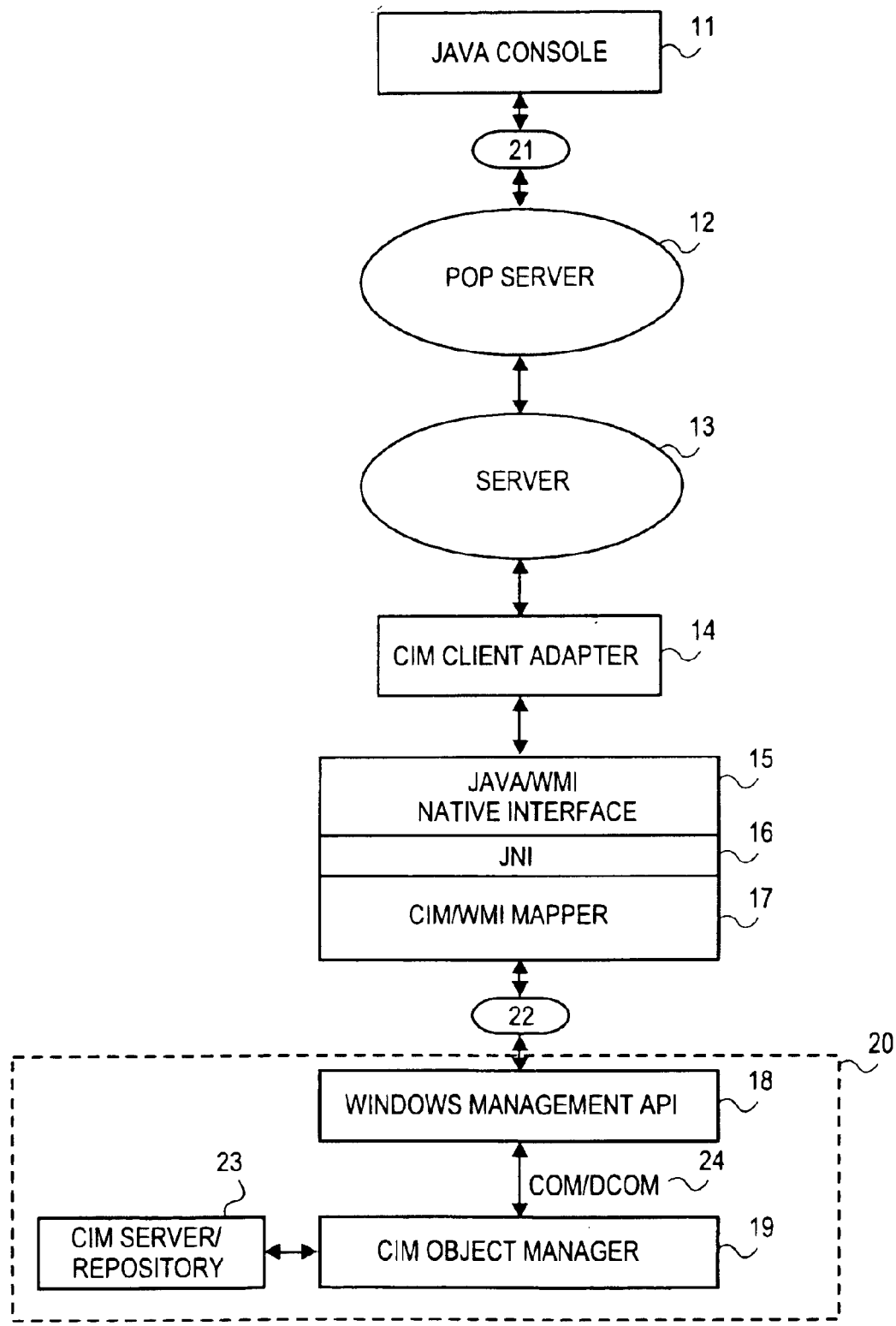
FIG. 1 depicts an exemplary embodiment of a remote management application in accordance with the invention, in which a Java-based console communicates with a Windows based Management Infrastructure.

The present invention solves the above-mentioned problem and others by providing a Java-based user interface that is operating system (OS) independent, and that permits communication with a server based on a Microsoft OS. The Common Information Model (CIM) is used to achieve the commonality between these two disparate technologies.

It is worthy to note that any reference herein to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

The embodiments of the invention enable remotely executing Java based programs to access a server containing applications written in other languages and upload component management information from the server. For example one possible implementation of the invention includes a Web based Platform Instrumentation Console (WPIC) executing in Java on a computer connected to the Internet. A second computer, also connected to the Internet via a point-of-presence (POP) server, for example, hosts the hardware and software components that the WPIC seeks to access. The operating system of the second computer controls the operation of the hardware and software components.

A web based user interface executing on a server, to which the hardware and software components sought to be accessed are coupled, serves as an intermediary between the WPIC and the hardware and software components to be accessed. The format that the data is being transferred from the hardware and software components to the web based user interface is not compatible with the WPIC. The web based user interface converts data from the server being accessed to Java format, which is acceptable to the WPIC. The user interface also converts commands from the WPIC to the predetermined format required by the hardware and software components being accessed such as, for example, WMI, or XML.

The invention thereby enables the WPIC to interact with the hardware and software components being accessed in a manner that was heretofore not possible.

As used herein, the term "server" is used in the singular for simplicity of description, however, a "server" may be embodied as a plurality of data processing machines that form a common hardware platform. As is consistent with usage in the art, however, these plural server machines are referred to collectively as a "server" (singular).

The processor controlling the computers described herein can be a general-purpose microprocessor, such as the Pentium series microprocessor manufactured by the Intel Corporation of Santa Clara Calif.

The memory for the computers described herein can be any device capable of storing analog or digital information, such as a hard disk, Random Access Memory (RAM), Read Only Memory (ROM), a compact disk, a magnetic tape, a floppy disk, and any combination thereof.

Each of the computers described herein includes an input/output (I/O) device, which can be an audio and/or visual device including, for example, a monitor, display, keyboard, keypad, touch pad, pointing device, microphone, speaker, video camera, camera, scanner, printer and/or port to which an I/O device can be attached or connected.

Alternatively, the input/output device can be a Graphical User Interface (GUI), which includes, for example, a web browser executing on the computer accessing web pages from a server over a computer network such as the Internet. The GUI can also include a mouse, a display and a memory, such as a video memory in the computer. The combination of these elements enables the user to select and navigate through various web pages, as required, to access the user interface used in the embodiments.

Exemplary Embodiment of a Java CIM Interface for WMI via COM/DCOM

FIG. 1 depicts a block diagram of an OS independent system for accessing hardware and software components in a managed server 20 via a web-based adapter 14.

In a preferred embodiment of the present invention, a Java WPIC 11 accesses the internet in conventional fashion, such as a point of presence (POP) server 12, which may be accessed via telephone modem, cable modem, local area network, intranet or other connection 21. The server 12 may in turn access another server 13 or servers prior to finally connecting to the server on which client adapter 14 is executing.

The CIM Client Adapter 14 written in Java, implements a set of APIs used by the WPIC 11 to perform CIM operations, such as adding, modifying or deleting a CIM class, CIM instance, and CIM qualifier type in a namespace.

One of the objectives of the present invention is to have the capability to access a Microsoft CIM Object manager (CIMOM). Since WMI does not support Java programming, to communicate with a Microsoft CIMOM the invention provides a Java/WMI Native Interface 15. A wrapper is provided around the WMI and is implemented through a Java Native Interface (JNI) 16. CIM operations are performed by the WMI interface 15 and communications with the managed server 20 are performed by a CIM/WMI mapper 17.

CIM data is transmitted from the CIM/WMI mapper 17 to the managed server 20 via a modem, local area network, parallel, serial, or other connection 22.

This embodiment includes inter alia the CIM Client adapter 14, and the CIM/WMI mapper 17.

CIM Client Adapter

The CIM Client adapter 14 written in JAVA implements a set of APIs, which allow the JAVA console 11 to perform CIM operations. The adapter thereby allows a web-enabled interface to the server 20 sought to be accessed. In implementing the APIs from JAVA console 11, the CIM client adapter 14 supports the following methods:

1. open( )
2. close( )
3. getUserLevel( )
4. getInstance( )
5. enumInstance( )
6. setInstance( )
7. invokeMethod( )
8. getClass( )
9. execQuery( )
10. deleteInstance( )
11. createInstance( )

A description of these methods follows.

1. Open( )

This method creates a new client connection to the CIM object manager on the specified host and namespace, using the specified user name and password.

Public void open (java.util.Hashtable connectInfo) throws CIMException

Parameters connectInfo

[in] Key and Value pairs, used to establish connection with CIM object manager.

The method will look for the following keys:

HOST_NAME—host address of the server at which CIMOM is running.

USER_ID—The user account to connect to CIMOM

USER_PASSWORD—The User password

NAMESPACE—The namespace in which operations will be performed

Return Values

Void

Throws: CIMException

Throws a CIM exception if the connection failed.

2. Close( )

Closes the client connection to the CIM Object Manager. This interface frees resources used for the client session.

Public synchronized void close( ) throws CIMException

Parameters

N/A

Return Values

N/A

Throws:CIMException

Throws a CIM Exception if the client session does not exist.

3. getUserLevel

Returns the user access level.

Public int get UserLevel( );

Parameters

N/A

Return Values

USERLEVEL_READ_WRITE—if the USER has Read Write permission.

USERLEVEL_READONLY—if the USER has only READ permission 4. getInstance

Gets the CIM instance for the specified CIM object path.

Public synchronized CIMInstance getInstance (CIMObjectPath name, boolean localOnly) throwsCIMException Parameters Name—CIM Object Path that identifies this CIM instance LocalOnly—if true, only the non-inherited properties are returned, otherwise all properties are returned.

Returns:

CIMInstance the CIM instance identified by the CIM object path

Throws: CIMException

Throws a CIM exception if the specified CIMObjectPath cannot be found

5. EnumInstances

Returns all instances (the whole instance and not just the names) belonging to the class specified in the path. This could include instances of all the classes in the specified class' hierarchy.

Public synchronized Enumeration enumInstances (CIMObjectPath path, boolean deep, boolean localOnly) throws CIMException Parameters Path—The CIMObjectPath identifying the class whose instances are to be enumerated.

deep—If set to CIMClient.DEEP, the enumeration returned will contain the names of all instances of the specified class and all classes derived from it. If set to CEMClient.SHALLOW only names of instances belonging to the specified class are returned.

LocalOnly—if true, only the non-inherited properties are returned, otherwise all properties are returned.

Returns:

Enumeration of CIMInstance

Throws: CIMException

Throws a CIM exception if the object cannot be found.

6. setInstance

Invokes the object manager on this client to modify the specified CIM instance in the specified namespace.

Public synchonied void setInstance(CIMObjectPath name, (CIMInstance ci)

throws CIMException

Parameters

Name—CIM object path that identifies the CIM instance to be added ci—CIM instance to be added Throws: CIMException Throws a CIMException error if the instance cannot be found.

7. invokeMethod

Executes the specified method on the specified object. A method is a declaration containing the method name, return type, and parameters in the method.

Public synchronizedCIMValueinvokeMethod (CIMObjectPathname, String methodName, Vector inParams, VectoroutParams) throwsCIMException Parameters:

Name—CIM object path that identifies the method

MethodName—the string name of the method to be invoked

InParams—the input parameters specified as a vector of CIMValue.

OutParans—The output parameters, the CIMValue of these parameters will be appended to the out Params vector.

Returns:

CIMValue—The return value of the method. If the method returns nothing, the return value will be null.

Throws: CIMException

Throws a CIM Exception if the specified method cannot be found 8. getClass

Gets the CIM class for the specified CIM object path.

public synchronized CIMClass getClass (CIMObjectPath name, boolean localOnly) throws CIMException.

Parameters:

name—the CIMObjectPath that identifies the CIM class localOnly—if true, only the non-inherited properties and methods are returned.

Returns:

CIMClass the CIM class identified by the CIMObjectPath

Throws: CIMException

Throws a CIM exception if the namespace or the model path identifying the object cannot be found.

9. execQuery

Executes a WQL query to retrieve objects.

Public java.util.Enumeration execQuery (CIMObjectPath reINS Java.lang.String query, Int ql)

Throws: CIMException 10. deleteInstance

Deletes the CIM instance specified by the CIM object path, a name that uniquely identifies a CIM object.

Public synchronized void deleteInstance (CIMObjectPath path) throws CIMException Parameters:

Path—The CIMObjectPath identifying the CIM instance to delete

Throws: CIMException

Throws a CIM Exception if the CIM instance does not exist 12. createInstance

Invokes the object manager on this client to add the specified CIM instance to the specified namespace.

Public synchronized void createInstance(CIMObjectPath name, CIMInstance ci) throws CIMException.

Parameters:

Name—CIM object path that identifies the CIM instance to be added ci—CIM instance to be added.

Throws: CIMException

Throws a CIM exception if the CIM instance already exists in the namespace

CIM/WMI Mapper

Communications with a Microsoft WBEM require compatability with WMI. Since WMI does not support JAVA programming, the invention achieves compatibility with the Microsoft OS based server by implementing a Java WMI interface 15 and CIM/WMI mapper 17 operating in conjunction with a JNI 16. Communication between the CIM Client adapter 14, the CIM/WMI mapper 15, JNI 16, WMI interface 17 and the managed server 20 is achieved via connection 22. Windows management APIs 18 facilitate communication with a CIMOM 19 and CIM repository 23 using COM/DCOM interfaces 24 as the access mechanism to CIMOM 19. The CIM/WMI mapper of the invention supports the following CIM operations:

1. CIMClientAdapter::open( )

Corresponding CIM/WMI method:

IwbemLocator

2. CIMClientAdapter::close( )

Corresponding CIM/WMI method:

N/A

3. CIMClientAdapter::getuserLevel( )

Corresponding CIM/WMI method:

N/A

4. CIMClientAdapter::getInstance( )

Corresponding CIM/WMI method:

IwbemServices::GetObject( )

5. CIMClientAdapter::enumInstances( )

Corresponding CIM/WMI method:

IwbemServices::GetObject( )

6. CIMClientAdapter::setInstance( )

Corresponding CIM/WMI method:

IwbemServices::PutInstance( )

7. CIMClientAdapter::invokeMethod( )

Corresponding CIM/WMI method:

IwbemServices::ExecMethod

8. CIMClientAdapter::getClass( )
Corresponding CIM/WMI method:
Iwbemservices::GetObject
9. CIMClientAdapter::execQuery( )
Corresponding CIM/WMI method:
IwbemServices::ExecQuery
10. CIMClientAdapter::deleteInstance
Corresponding CIM/WMI method:
IwbemServices::DeleteInstance Java Native Interface The Java Native Interface (JNI) is the native programming interface for Java. The JNI allows Java code to be portable across various platforms. The JNI framework permits the use of native methods to perform many operations. Native methods may represent legacy applications or they may be written explicitly to solve a problem that is best handled outside of the Java programming environment.

In the present invention, the JNI is used to make the library of the managed server 20 accessible to Java code. The JNI allows code that runs within a Java Virtual Machine (VM) to operate with applications and libraries written in other languages, such as C, and C++ and allows the JNI to be embedded into native applications. The Java Virtual machine is responsible for interpreting Java byte code, and translating this into actions or operating system calls.

Figure 2:
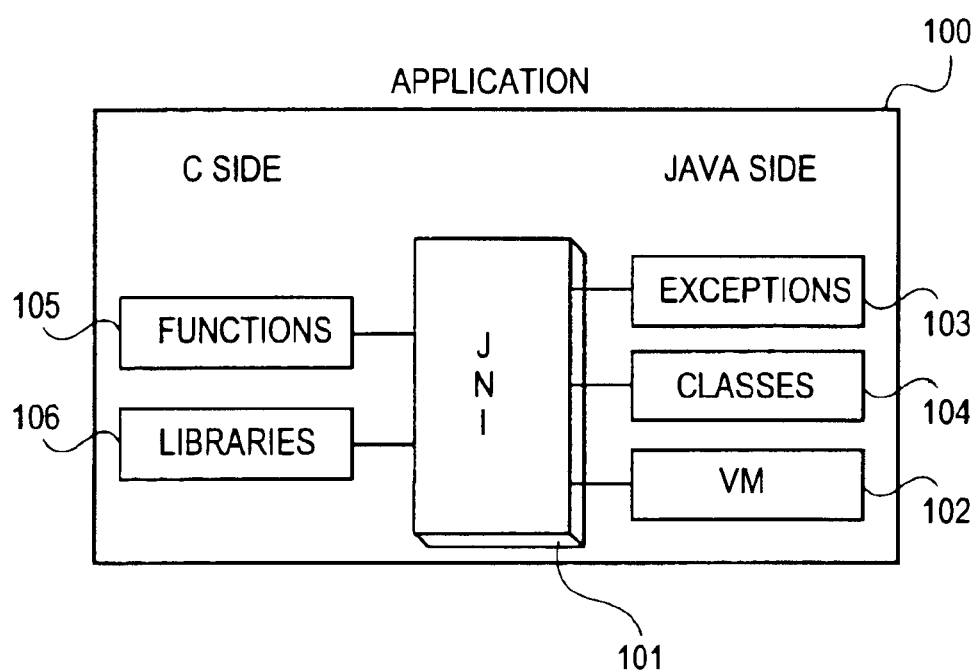
FIG. 2 depicts a schematic showing how a Java Native Interface (JNI) ties the C language side of an application to the Java side.

With reference to FIG. 2, an application 100 typical of the invention is depicted. A JNI 101 is implemented in conjunction with a VM 102 to serve as a translator between Exceptions 103, and classes 104 on the Java side and Functions 105 and Libraries 106 written in C, on the managed server side.

Exemplary Embodiment of a Java CIM Interface for WMI via XML

Figure 3:
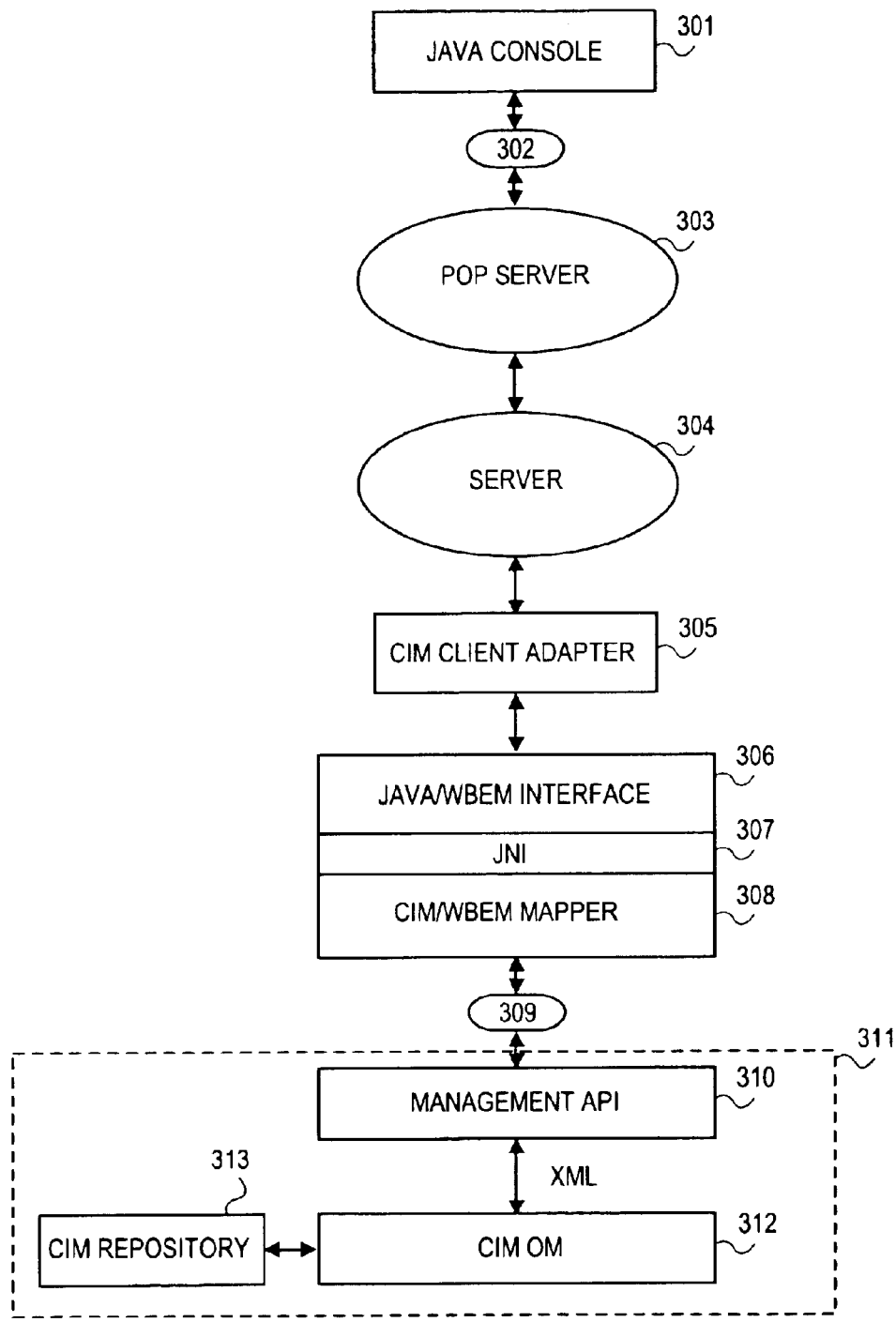
FIG. 3 depicts a second exemplary embodiment of a remote management application in accordance with the invention.

Embodiments of the invention are also applicable to management infrastructues on operating systems using XML based communications. In a second embodiment of the present invention and with reference to FIG. 3, a Java WPIC 301 accesses the internet in conventional fashion, such as a point of presence (POP) server 303, which may be accessed via telephone modem, cable modem, local area network, intranet or other connection 302. The server 303 may in turn access another server 304 or servers prior to finally connecting to the server on which client adapter 305 is executing.

The CIM Client Adapter 305 written in Java, implements a set of APIs used by the WPIC 301 to perform CIM operations such as adding, modifying or deleting a CIM class, CIM instance, and CIM qualifier type in a namespace.

To communicate with a WBEM system operating on a server that does not support Java programming, the invention provides a Java interface 306. A wrapper is provided around the WBEM system and is implemented through a Java Native Interface (JNI) 397. CIM operations are performed by the WBEM interface 306 and communications with the managed server 311 are performed by a CIM/WDEM mapper 308. The CIM Client Adapter 305, Java WBEM interface 306, JNI 397, and CIM/WBEM mapper 308 operate in a similar fashion to the first embodiment described above and depicted in FIG. 1.

Similarly, CIM data is transmitted from the CIM/WBEM mapper 308 to the managed server 311 comprising WBEM management APIs 310, a CIMOM 312 and CIM repository 313, via a modem, local area network, parallel, serial, or other connection 309. In this embodiment, however, WBEM APIs 310, facilitate communication with CIMOM 312 and CIM repository 313 via XML instead of COM/DCOM.

Although various embodiments are specifically illustrated and described herein, it will be appreciated that modifications and variations of the invention are covered by the above teachings and within the purview of the appended claims without departing from the spirit and intended scope of the invention. For example, while the embodiments depict the use of specific data management and interface standards, other data management and interfaces will suffice. Moreover, while specific program and protocols are included, other protocols (including subsequently developed protocols) may be sufficient to implement the embodiments described herein. These examples should not be interpreted to limit the modifications and variations of the invention covered by the claims, but are merely illustrative of possible variations.

What is claimed is:

1. A system comprising:

a processor;

a machine accessible medium in communication with the processor, and instructions encoded in the machine accessible medium, wherein the instructions, when executed by the processor, cause the system to perform operations comprising:

receiving a Common Information Model (CIM) communication from a JAVA based console;

in response to receiving the CIM communication from the JAVA based console, automatically converting the CIM communication into a Windows Management Instrumentation (WMI) communication; and communicating the WMI communication to a managed server that uses a MICROSOFT operating system, the communicating to occur via a WMI application program interface (API) of the managed server.

2. A system according to claim 1, wherein:

the CIM communication from the JAVA based console is received at an intermediate server; and the system further comprises:

the managed server, the managed server to use a MICROSOFT Component Object Model (COM) based model to process the WMI compatible command.

3. A system according to claim 2, wherein the MICROSOFT COM based model comprises a model selected from the group consisting of:

a Component Object Model (COM); and a Distributed Component Object Model (DCOM).

4. A system according to claim 1, further comprising:

a client system to host the JAVA based console.

5. A system according to claim 1, wherein the operation of converting the CIM communication to a WMI communication comprises:

converting the CIM communication to a CIM/WMI communication, wherein the CIM/WMI communication is compatible with a WMI API and a CIM format.

6. A system according to claim 1, wherein the operation of converting the CIM communication to a WMI communication comprises:

mapping a method that is not compatible with WMI to a corresponding method that is compatible with WMI.

7. A system according to claim 1, wherein:

the operation of receiving a CIM communication from a JAVA based console comprises receiving the CIM communication from a client processing system that hosts the JAVA based console; and the CIM communication from the JAVA based console is received at an intermediate server.

8. A system according to claim 1, wherein:
the CIM communication from the JAVA based console is received via a network selected from the group consisting of a local area network (LAN), a wide area network (WAN), and an Internet.

9. An apparatus comprising:
a machine accessible medium; and
instructions encoded in the machine accessible medium, wherein the instructions, when executed by a processing system, cause the processing system to perform operations comprising:
receiving a Common Information Model (CIM) communication from a JAVA based console;
in response to receiving the CIM communication from the JAVA based console, automatically converting the CIM communication into a Windows Management Instrumentation (WMI) communication; and
communicating the WMI communication to a managed server that uses a MICROSOFT operating system, the communicating to occur via a WMI application program interface (API) of the managed server.

10. An apparatus according to claim 9, wherein the operation of converting the CIM communication to a WMI communication comprises:
converting the CIM communication to a CIM/WMI communication, wherein the CIM/WMI communication is compatible with a WMI API and a CIM format.

11. An apparatus according to claim 9, wherein the operation of converting the CIM communication to a WMI communication comprises:
mapping a method that is not compatible with WMI to a corresponding method that is compatible with WMI.

12. An apparatus according to claim 9, wherein:
the processing system comprises an intermediate server; and
the operation of receiving a CIM communication from a JAVA based console comprises receiving the CIM communication from a client processing system that hosts the JAVA based console.

13. An apparatus according to claim 9, wherein the processing system receives the CIM communication from the JAVA based console via a network selected from the group consisting of a local area network (LAN), a wide area network (WAN), and an Internet.

14. An apparatus according to claim 9, wherein the instructions implement an adapter program comprising:
a CIM to WMI mapper, a JAVA native interface (JNI), and a WMI interface.

15. An apparatus according to claim 14, wherein the instructions comprise JAVA code.

16. A method comprising:
receiving, at a processing system, a Common Information Model (CIM) communication from a JAVA based console;
in response to receiving the CIM communication from the JAVA based console, automatically converting the CIM communication into a Windows Management Instrumentation (WMI) communication; and
communicating the WMI communication to a managed server that uses a MICROSOFT operating system, the communicating to occur via a WMI application program interface (API) of the managed server.

17. A method according to claim 16, wherein the operation of converting the CIM communication into a WMI communication comprises:
converting the CIM communication to a CIM/WMI communication, wherein the CIM/WMI communication is compatible with a WMI API and a CIM format.

18. A method according to claim 16, wherein the operation of converting the CIM communication to a WMI communication comprises:
mapping a method that is not compatible with WMI to a corresponding method that is compatible with WMI.

19. A method according to claim 16, wherein:
the processing system comprises an intermediate server; and
the operation of receiving a command from a JAVA based console comprises receiving the command from a client processing system that hosts the JAVA based console.

20. A method according to claim 16, wherein the operation of receiving the CIM communication from the JAVA based console comprises:
receiving the CIM communication via a network selected from the group consisting of a local area network (LAN), a wide area network (WAN), and an Internet.

* * * * *

UNITED STATES PATENT AND TRADEMARK OFFICE
CERTIFICATE OF CORRECTION

PATENT NO.    : 6,854,122 B1
DATED         : February 8, 2005
INVENTOR(S)   : Sheriff et al.

It is certified that error appears in the above-identified patent and that said Letters Patent is hereby corrected as shown below:

Column 3,
Line 17, delete "1I" and insert -- 11 --.

Column 5,
Line 7, delete "CEMClient.SHALLOW" and insert -- CIMClient.SHALLOW --.

Column 7,
Line 57, delete "WDEM" and insert -- WBEM --.
Line 64, delete "modern" and insert -- modem --.

Signed and Sealed this

Twenty-fourth Day of May, 2005

JON W. DUDAS
*Director of the United States Patent and Trademark Office*